Dec. 19, 1967     J. W. SILVER ET AL     3,358,512
TARE BUCKET HANDLING APPARATUS AND TARE BUCKET THEREFOR
Filed Jan. 14, 1965     3 Sheets-Sheet 1
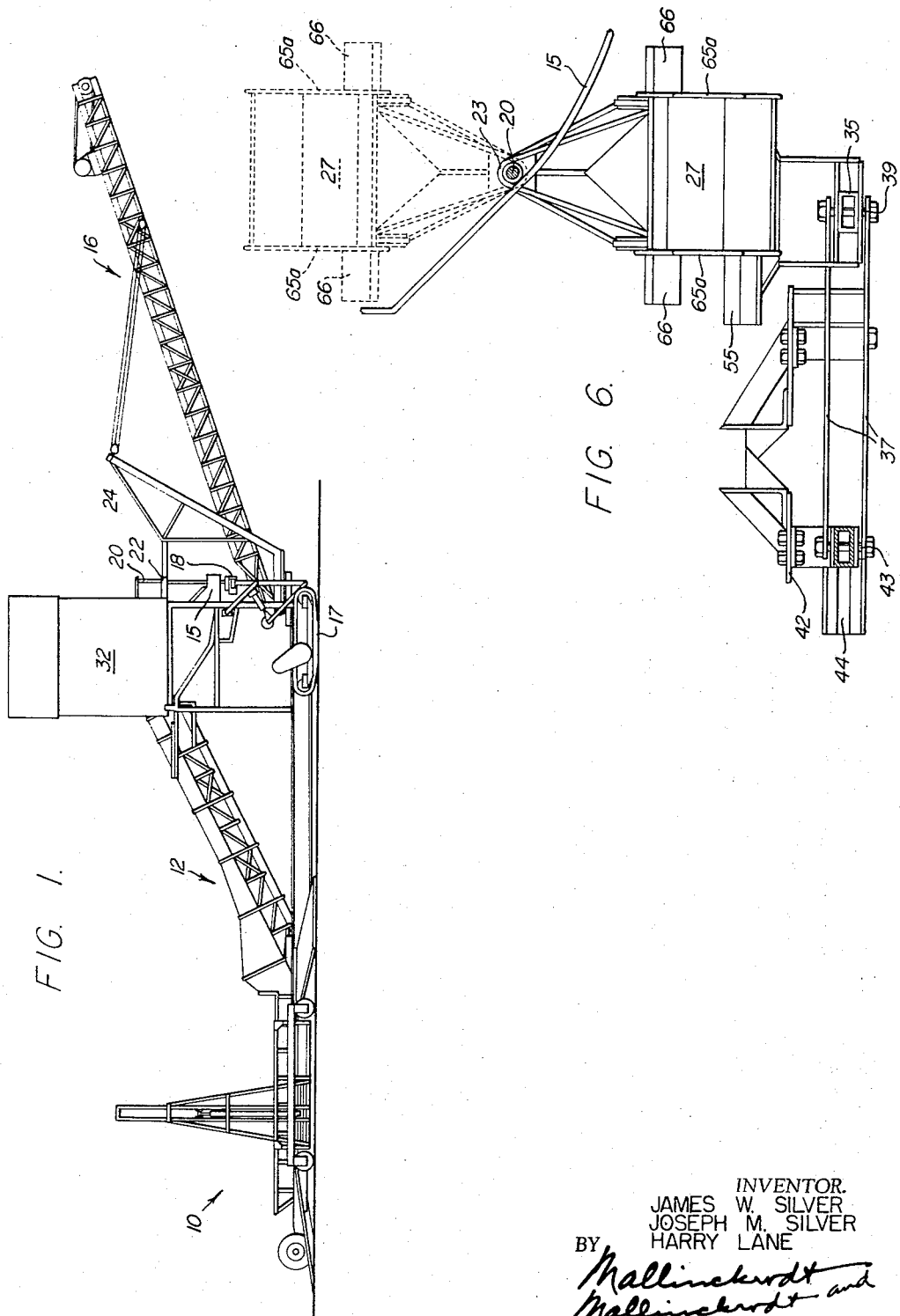
INVENTOR.
JAMES W. SILVER
JOSEPH M. SILVER
HARRY LANE
BY
ATTORNEYS Dec. 19, 1967   J. W. SILVER ET AL   3,358,512
TARE BUCKET HANDLING APPARATUS AND TARE BUCKET THEREFOR
Filed Jan. 14, 1965                                 3 Sheets-Sheet 2
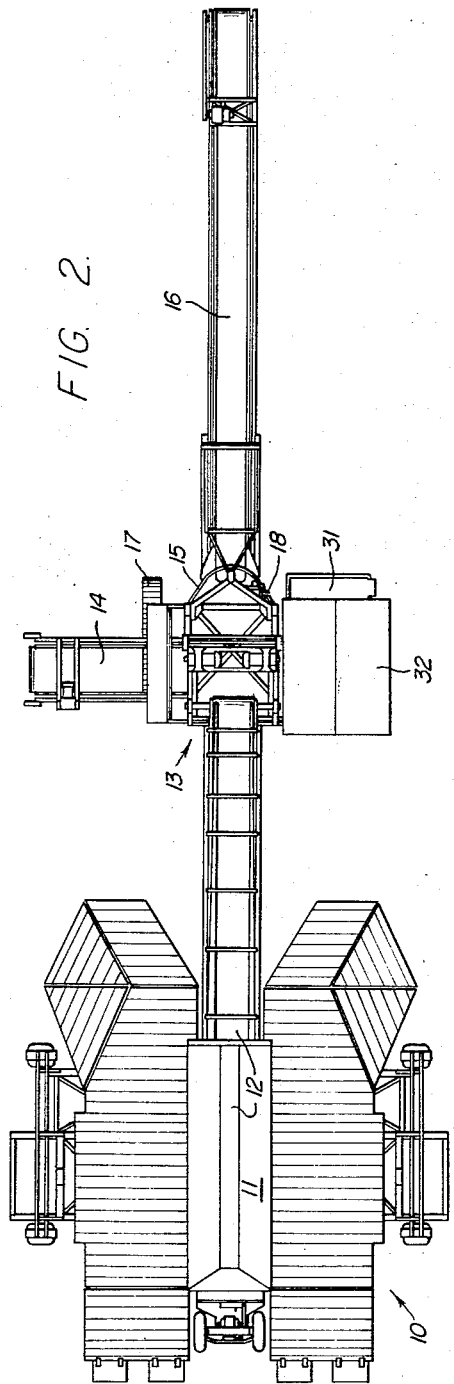
INVENTOR.
JAMES W. SILVER
JOSEPH M. SILVER
HARRY LANE
BY
*Mallinckrodt and Mallinckrodt*
ATTORNEYS Dec. 19, 1967  J. W. SILVER ETAL  3,358,512
TARE BUCKET HANDLING APPARATUS AND TARE BUCKET THEREFOR
Filed Jan. 14, 1965  3 Sheets-Sheet 3

INVENTOR.
JAMES W. SILVER
JOSEPH M. SILVER
HARRY LANE
BY
ATTORNEYS

United States Patent Office 3,358,512
Patented Dec. 19, 1967

3,358,512
TARE BUCKET HANDLING APPARATUS AND
TARE BUCKET THEREFOR
James Watson Silver, Joseph M. Silver, and Harry Lane, Ogden, Utah, assignors to Ogden Iron Works Company, Ogden, Utah, a corporation of Utah
Filed Jan. 14, 1965, Ser. No. 425,416
14 Claims. (Cl. 73—424)

ABSTRACT OF THE DISCLOSURE

A sampler mechanism having a bucket that is moved into, through, and out of the path of beets being processed by a beet piler or the like, to thereby receive samples of the beets. The bucket containing the sample is raised to a storage house on the piler, the beet sample is dumped from the bucket to be later analyzed for tare and/or for sugar content, and the bucket is returned to the sampler mechanism for another sampling operation.

---

In the harvesting and handling of sugar beets it has long been customary for growers to cut off the tops of the beets, dig the topped beets from the ground, and then transport them by truck to a beet piler, where the loaded truck is weighed and the beets dumped and piled.

The beet piler is a machine that not only stacks the beets into large piles to await processing, but that subjects them to a screening procedure as well for the elimination of as much as possible of the adherent and loose soil and other foreign matter, such as sticks, stones, and other trash, which are inevitably associated with the beets as they come from the fields.

The empty trucks are positioned to receive the soil and trash removed from the beets and are then re-weighed, this "empty" weight thereby including the weight of such soil and trash as is removed.

Not all of the soil and trash can be removed from the beets; moreover, the tops may not be closely cut. Since the payment to the grower is customarily based on the weight of the sugar-carrying portions of the beets, the percentage of the load that is tare, i.e., soil, trash, and remaining portions of the tops, must be determined and deducted from the total weight of the harvested beets delivered by the grower.

To obtain a complete determination of the tare weight to be deducted from the total weight, samples are taken from each dumped truckload of beets, or, if the beets are from the same fields, from two or more truckloads. The tare is removed from these samples and weighed to enable a reasonably accurate estimate to be made of the total adherent tare weight for the particular truckload or loads concerned.

Recently it has been proposed that the sugar content of such samples be also determined in order to more accurately establish the value of and proper price to be paid for the beets. It is expected that this will soon become standard practice in the industry.

It is not practical to thoroughly scrub the beet samples nor analyze for sugar content at the beet piler. As a consequence, a sample-receiving house is customarily constructed on the piler to serve as a storage area for the samples, which are maintained separate. Periodically during the operation of the piler and at the end of each day the samples are collected and taken away for tare removal or for both that and analysis of sugar content.

It is convenient to locate the storage house well above the beet-piling mechanism, so that it will be out of the way. However, with the house so located, it has been necessary for an employee to manually carry the full tare bucket from and the empty tare bucket back to, the sampling mechanism.

It is the purpose of this invention to do away with the necessity of an operator of the equipment moving from the storage house down to the sampling area to obtain the tare bucket, carrying it up to the house, dumping its contents into a separated storage receptacle, not shown, and then returning it to the sampling area in preparation for another sampling operation.

In the making of the invention, an object was to provide for mechanically picking up and elevating the tare bucket from a sampling mechanism with assurance of positive and effective transfer from sampling to lifting mechanisms, and to provide similarly for lowering of the tare bucket following manual taking and dumping of the sample at the storage house level.

Another object was to permit the continued use of a preferred type of sampling mechanism by which the tare bucket is swung horizontally and circularly through the stream of beets to be sampled.

In accomplishing the purpose and objects of the invention as above specified, a power lift is provided at a point constituting both the origin and termination of the preferred circular-swing sampling mechanism, together with cooperative bucket-transfer structure on the lift and sampling mechanisms, respectively. A special tare bucket is advantageously employed, along with correlated forms of pick-up and receiving structures for the bucket-transfer means, so that positive transfer is assured despite careless or inept handling of the tare bucket by the operator.

The power lift is preferably operable through controls conveniently located in the vicinity of the storage house, and, to this end, is desirably powered hydraulically.

Another control is conveniently positioned in the vicinity of the storage house to enable an operator to remotely perate the sampling mechanism.

There is shown in the accompanying drawings a specific embodiment of the invention representing what is presently regarded as the best mode of carrying out the generic concepts in actual practice. From the detailed description of this presently preferred form of the invention, other more specific objects and features will become apparent.

In the drawings:

FIG. 1 represents a view in side elevation of a typical beet piler equipped with the invention;

FIG. 2, a top plan view of the beet piler of FIG. 1;

FIG. 3, a fragmentary side elevation drawn to a considerably larger scale of the power lift, the tare bucket, and the sampling mechanism, with the lift in its lowermost position and the sampling mechanism and bucket in transfer positions;

FIG. 4, an elevation looking from the right in FIG. 3 and showing, by broken lines, the swung, sampling position of the sampling mechanism and tare bucket carried thereby;

FIG. 5, a view corresponding to that of FIG. 3, but showing the tare bucket and power lift in their uppermost elevated positions following pick-up of the bucket from the sampling mechanism;

FIG. 6, an enlarged, fragmentary, horizontal section taken on the line 6—6 of FIGS. 3 and 4, with the broken-line bucket position of FIG. 4 being shown;

FIG. 7, an enlarged fragmentary view in side elevation of the tare bucket and transfer portions of the lift and sampling mechanism as shown in FIG. 3 but at the instant of bucket pick-up or return;

FIG. 8, a corresponding view but from the standpoint of FIG. 4. Referring now to the drawings:

In the illustrated preferred embodiment, the beet piler of FIGS. 1 and 2 includes a platform assembly 10 at its front end onto which the beets are dumped by the haulage trucks and from which they pass into a hopper 11 that feeds them onto a belt conveyor 12, which, in turn, transports them to a screening device 13, for example that shown in the copending application for U.S. patent, Ser. No. 382,878 of James W. Silver and Joseph M. Silver entitled, "Roll Screen for Cleaning Root Crops," now patent No. 3,217,346.

The more easily removed tare is separated from the beets by the screening device 13 and is dropped onto a conveyor 14, FIG. 2, that moves it to an awaiting empty truck (not shown). A deflector shield 15 surrounds the discharge end of the screening device to insure that the beets are passed onto an inclined belt conveyor 16 that elevates them to a proper height for dropping them to form a pile. The entire machine is moved slowly forward by means of power-driven crawler tracks 17 to form rows of piled beets.

The belts are sampled periodically by "cutting" a sample from the flowing stream discharged from the screening device 13 onto belt conveyor 16. As has been explained, one sample is normally taken from each truckload of beets dumped onto platform assembly 10, although fewer samples may be taken where the beets are all from the same field so that they tend to be uniform in tare and in sugar content.

The sampling mechanism 18 is here shown as a known and preferred type constructed and arranged to make full circular swings in a horizontal plane from a point of origin back to termination at such point of origin. Thus, a vertical shaft 20, FIGS. 3–5, which serves as a pivot axis for the sampling mechanism, is journaled and supported by bearings 22, FIG. 1, and 23, FIG. 6, that are respectively mounted on frame member 24 and deflector shield 15.

A bucket support 25, constituting part of the bucket transfer means, is attached to the lower end of shaft 20 by a pair of cantilevered arms 26, FIG. 4. Rotation of shaft 20 will, therefore, swing the bucket support, and the bucket 27 carried thereby, from a point of origin through a complete circle about the pivot axis formed by shaft 20 to termination at the point of origin.

Shaft 20 is rotated by means of gears in a gear box 28 positioned at its upper end and fixed to a frame member 29 of the piler. A handle 30 is provided to control rotation of the gears and to turn shaft 20. The handle is conveniently positioned adjacent to an elevated platform 31 on which a storage house 32 is situated at a level where it can be easily reached by an operator standing on the platform.

Once handle 30 has been turned to rotate shaft 20 and to swing the bucket support, and the bucket 27 carried thereby, through the stream of beets discharging from the screening device, and back to its point of origin, the sample collected in the bucket is ready to be lifted to the storage house.

The lifting mechanism of the invention includes an upright post 35, FIGS. 3–5, 7 and 8, that is raised and lowered for the purpose of transferring the bucket from the sampling mechanism to the lifting mechanism and vice versa and for elevating it to the vicinity of the storage house and lowering it back to the level of the sampling mechanism.

Post 35 is supported and guided in its vertical movement by a pair of parallel arms 36 and 37, FIG. 3, which are pivotally connected at one set of ends to the post by pins 38 and 39, respectively. Arm 36 is pivotally connected near its other end to a frame member 40 of the machine by a pin 41, and arm 37 is similarly connected to a frame member 42 by a pin 43.

Such other end of arm 36 extends beyond pivot pin 41 and carries a weight 4 that counterbalances the upright post 35, the transfer structure carried by post 35, and the arms 36 and 37.

A hydraulic cylinder 45 has its cylindrical housing 46 pivotally fixed to frame member 47 of the machine and its piston rod 48 pivotally connected to projection 33 on the end of arm 36 adjacent weight 44. Thus, as rod 48 is moved out of housing 46, arm 36 is pivoted to raise post 35, and, as such rod is retracted, post 35 is lowered. Because it extends parallel to arm 36 and is the same length as that portion of arm 36 which lies between frame member 40 and post 35, arm 37 holds post 35 in a vertical position throughout its entire travel.

Piston rod 48 is extended and retracted by the supplying and exhausting of pressure fluid to and from opposite sides of piston 49 through conduits 50 and 51. A control valve 52, FIG. 4, positioned adjacent and somewhat above platform 31, regulates flow through the conduits.

A cantilever bucket transfer structure 54 is mounted on the upper end of post 35 to provide means whereby bucket 27 is picked up and lifted from bucket support 25 as the post moves upwardly and is re-positioned on such bucket support as the post moves downwardly. The transfer structure includes a guide plate 55, see especially FIGS. 4 and 8, having an inclined upper surface 56, a reversely inclined lower surface 57, and a vertical surface 58 interconnecting the inclined surfaces.

During upward movement of post 35, guide plate 55 cooperates with rollers 59 journaled in the ends of arms 60 that extend out from bucket support 25 to insure proper alignment of the bucket support for picking up of the bucket by the plate. For pick-up purposes, bucket 27 is constructed with an inclined wall 61, FIG. 4, that angularly coincides with the inclined upper surface 56 of the pick-up plate, and has a pair of hooks 62, FIG. 8, that are adapted to extend over the upper edge of the inclined upper surface of the plate. It should be noted that hooks 63 at the other side of bucket 26 are adapted to extend over and engage the upper edge of an inclined plate 64, FIG. 7, of the bucket support and that side wall 65, FIG. 8, of the bucket angularly coincides with such inclined plate 64. Thus, when the bucket is suspended from the bucket transfer structure or carrier 54 by means of hooks 63, the upper edge of plate 64 and side wall 65 rests flush against the plate.

If the bucket support 25 is out of bucket pick-up alignment when post 35 and the transfer structure 54 carried thereby are raised, one or the other of the rollers 59 contacts inclined upper surface 56 of the plate 55. Continued upward movement of the post and transfer structure will then cause the bucket support 25 to pivot about the axis formed by shaft 20 until the rollers are in position to allow vertical surface 58 to move past them. The bucket support is then properly aligned and further raising of the post and transfer structure moves the top edge of inclined upper surface 56 into engagement with the inner curve of hooks 62 to lift the bucket from its suspended position on inclined plate 64 of the bucket support and to position it on inclined upper surface 56 during continuation of the upward movement. An upward extension 55a, FIGS. 3 and 4, of plate 55 prevents bucket 27 sliding off the transfer structure.

When post 35 reaches its upper limit (as determined by the lengths of arms 36 and 37 and the stroke of the hydraulic cylinder), bucket 27 is positioned adjacent platform 31 and at a convenient level to be grasped by an operator. Upwardly extending handles 65a are provided for the purpose.

As rod 48 of cylinder 45 is retracted, post 35 and the transfer structure 54 at its upper end are lowered. If the bucket support 25 is not properly positioned when the post and transfer structure move down, the reversely inclined lower surface 57 will engage one or the other of the rollers 59. Continued downward movement will then rotate the bucket support 25 into alignment, wherein vertical surface 58 can move past the rollers.

Guide wings 66, FIGS. 3, 4, and 5, diverge upwardly from the bucket support 25 at the sides of inclined plate 64, so that, when the bucket is lowered and the bucket support is not precisely aligned, the bottom of the bucket will contact one or the other of the wings to cam the bucket support into proper position.

A sampling operation begins with bucket 27 suspended by hooks 63 from inclined plate 64 of bucket support 25. The sample is obtained by an operator standing on platform 31, who turns handle 30 to swing the bucket support and the bucket beneath the stream of beets and back to to its starting position.

The operator then manipulates control valve 52 to raise post 35 and the transfer structure 54 mounted thereon. As the post moves upwardly inclined surface 56 of pick-up plate 55 will engage one or the other of the rollers 59. If the transfer structure 54 and bucket support 25 are not properly aligned, continued upward movement of the transfer structure will cause the bucket support to rotate about the vertical axis formed by shaft 20 into proper alignment, so that the upper edge of the inclined surface 56 will engage the inner curve portion of hooks 62 on the bucket.

The bucket is then picked up by the upwardly moving transfer structure and is carried to a position adjacent to but somewhat above the level of the platform 31. Once the bucket has been raised to this uppermost level, the operator can readily grasp handles 65a and lift the bucket off pick-up plate 55. He dumps the sampled beets into one of a number of separated storage receptacles inside the sample-receiving house 32 and replaces the bucket on the plate 55 such that it is again suspended by hooks 62 from the upper edge of inclined surface 56.

A conventional control valve, not shown, is then manipulated by the operator to exhaust fluid from cylinder 46 at the rear of piston 49 through conduit 51, while, at the same time, supplying fluid to the front, i.e., the rod side, of the piston through conduit 50 to move the piston rod into the cylinder. This rotates arm 36 to lower post 35, the transfer mechanism, and the bucket, until hooks 63 on the bucket engage the upper edge of inclined plate 64. The bucket is then suspended on bucket support 25, and post 35 and the transfer structure continue their downward movement without the bucket.

If the bucket support is not properly aligned during downward movement of the bucket, the bottom of the bucket will contact one or the other of guide wings 66 to cam the bucket support into alignment.

Once the bucket has been returned to its suspended position on the bucket support and the transfer structure has been moved down, out of the way, the bucket is ready to be used for another sampling operation.

Whereas there is here illustrated and specifically described a certain preferred construction of apparatus which is presently regarded as the best mode of carrying out the invention, it should be understood that various changes may be made and other constructions adopted without departing from the inventive subject matter principally pointed out and claimed herebelow.

We claim:

1. Tare bucket handling apparatus for beet pilers, comprising a sampling mechanism for removably receiving a tare bucket and for moving it transversely through a flowing stream of beets, whereby a sample of the beets is obtained in the bucket; and lift means movable independently of said sampling mechanism and said bucket and adapted to pick up and remove said bucket from said sampling mechanism and to elevate it to a remote upper location and to return it to the sampling mechanism, said bucket being removable from said lift means while in said upper location for dumping the beets therefrom.

2. Tare bucket handling apparatus according to claim 1, wherein the sampling mechanism includes a vertical shaft having a lower end adjacent to the location where the sample of beets is obtained and an upper end adjacent to the remote upper location; a bucket support cantilever mounted on the lower end of the vertical shaft; means supporting said shaft for rotation; and means at the upper end of the shaft for rotating the shaft, whereby the bucket support is moved from a starting position out of said flow-stream of beets, into the flow stream and back to the starting position.

3. Tare bucket handling apparatus according to claim 2, wherein the bucket support has a bucket-receiving plate thereon; and the apparatus includes a bucket having hooks on one side thereof adapted to engage said plate, whereby said bucket can be removably suspended on said support.

4. Tare bucket handling apparatus according to claim 3, wherein upwardly diverging guide wings are provided at opposite sides of the bucket support to act as guides for the bucket as the hooks are moved into engagement with the plate.

5. Tare bucket handling apparatus according to claim 3, wherein the bucket also has hooks on the other side thereof; the means for lifting the bucket from the sampling mechanism to a remote upper location and for returning it to the sampling mechanism comprises a transfer structure including a lift-plate adapted to engage the said hooks on the other side of the bucket; and there are additionally provided means for moving said transfer structure from a position wherein the lift-plate is beneath the said hooks on the other side of the bucket to a position adjacent the upper end of the vertical shaft of the sampling mechanism and back again, whereby the bucket is raised from the support plate of the bucket support during upward movement of the transfer structure and is positioned on the support plate during downward movement thereof.

6. Tare bucket handling apparatus according to claim 5, wherein upwardly diverging guide wings are provided at opposite sides of the bucket support to act as guides for the bucket as it moves into engagement with the support plate; a plurality of roller arms extend outwardly from the support plate beneath the guide wings; and rollers are journaled at the end of each of said roller arms, said rollers being adapted to engage the lift-plate on the transfer mechanism when the sampling means is not aligned with the bucket support so that the bucket will be properly positioned on the support and lift-plates during vertical movement of the transfer mechanism.

7. In combination, a sugar beet piler having means for transporting beets dumped thereon, said means including a screening device, an end conveyor belt assembly for carrying beets discharged from the screening device to a discharge point; a sample receiving house positioned above the level of the discharge end of the screening device; a tare bucket; sampling means for moving said bucket transversely into and out of the path of beets discharged from the screening device onto the end conveyor belt, whereby a sample of beets is obtained in the bucket; and means for lifting said bucket from said sampling means to a position adjacent to said sample receiving house and for returning said bucket to the sampling means.

8. The combination of claim 7, wherein the sampling means includes a vertical shaft having a lower end positioned between the screening device and the end conveyor belt assembly, and an upper end adjacent to the sample receiving house; a bucket support cantilever mounted on the lower end of the vertical shaft; support means journaling said shaft; and means at the upper end of said shaft for rotating the shaft, whereby the bucket support is remotely movable from a starting position located out of a stream of beets discharging from the screening assembly, into and through the said stream and back to the starting position.

9. The combination of claim 8, wherein the sampling means has a support plate thereon; and wherein the bucket has hooks on one side thereof adapted to engage said support plate, whereby said bucket is removably suspended on the sampling means.

10. The combination of claim 9, wherein upwardly diverging guide wings are provided at opposite sides of the sampling means to act as guides for the bucket as it moves into engagement with the support plate.

11. The combination of claim 10, wherein the bucket has hooks on the other side thereof; and the means for lifting said bucket from the sampling means to a position adjacent to the sample receiving house and for returning said bucket to the sampling mechanism comprises a transfer structure having a lift-plate thereon, said lift-plate being adapted to engage the hooks on the other side of the bucket; and means for moving said transfer structure from a position adjacent the house and back again, whereby the bucket is raised from the support plate of the bucket support during upward movement of the transfer structure and is positioned on the support plate during downward movement thereof.

12. The combination of claim 11, wherein a plurality of roller arms extend outwardly from the support plate beneath the guide wings; and rollers are journaled at the end of each of said roller arms, said rollers being adapted to engage the lift plate on the transfer structure when the bucket support is not aligned, such that the bucket support is rotated into alignment during vertical movement of the transfer structure.

13. A tare bucket for beet pilers, comprising a pair of end walls, a pair of side walls; and a bottom wall secured together to form a beet-receiving receptacle having its top open, the said side walls converging from said open top to said bottom wall; handle means secured to said receptacle for manipulating the bucket; and downwardly-open hooks extending outwardly and oppositely from said side walls, respectively, the hooks at one side of the receptacle being adapted to be engaged by lift means for the bucket, and the hooks at the other side being adapted to engage sampler means for transporting the bucket into and out of a flow-stream of beets.

14. A tare bucket according to claim 13, wherein the hooks comprise a pair of mutually spaced hooks at each side of the receptacle adjacent to the upper edges of the side walls.

References Cited

UNITED STATES PATENTS

| | | | |
|---|---|---|---|
| 875,529 | 12/1907 | Joehnck | 209—247 |
| 910,852 | 1/1909 | Pickett | 209—248 |
| 1,591,092 | 7/1926 | McGregor | 73—424 |
| 2,404,373 | 7/1946 | Harlow | 73—421 |
| 2,600,329 | 6/1952 | Romine et al. | 73—423 |
| 3,217,346 | 11/1965 | Silver et al. | 15—3.11 |

LOUIS R. PRINCE, *Primary Examiner.*

D. M. YASICH, *Assistant Examiner.*